W. L. RUNZEL.
TELEPHONE SWITCHBOARD CABLE.
APPLICATION FILED MAR. 8, 1907.
919,384.
Patented Apr. 27, 1909.
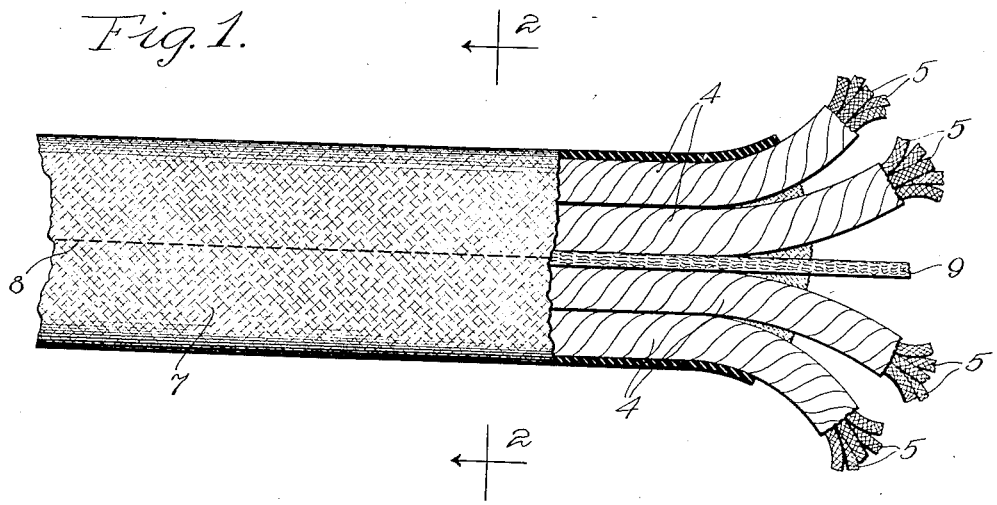
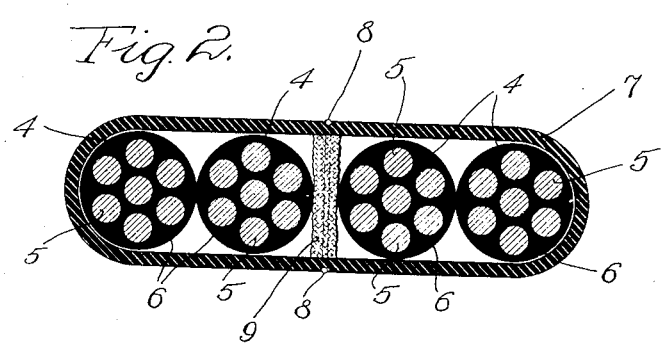
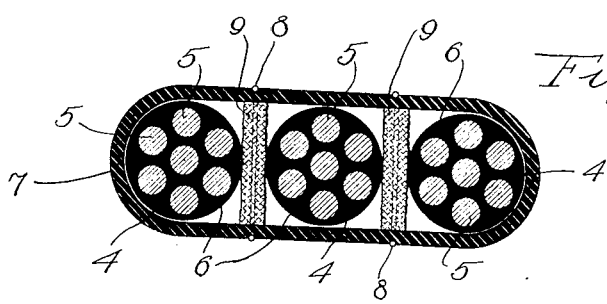
Witnesses:
Arthur H. Boettcher,
John F. Stahr.
Inventor
William L. Runzel
By Charles A. Browne
Attorney

UNITED STATES PATENT OFFICE.

WILLIAM L. RUNZEL, OF CHICAGO, ILLINOIS, ASSIGNOR TO RUNZEL-LENZ ELECTRIC MANUFACTURING COMPANY, OF CHICAGO, ILLINOIS, A CORPORATION OF ILLINOIS.

TELEPHONE-SWITCHBOARD CABLE.

No. 919,384.  Specification of Letters Patent.  Patented April 27, 1909.

Application filed March 8, 1907. Serial No. 361,273.

*To all whom it may concern:*

Be it known that I, WILLIAM L. RUNZEL, citizen of the United States, residing at Chicago, in the county of Cook and State of Illinois, have invented a certain new and useful Improvement in Telephone-Switchboard Cables, of which the following is a full, clear, concise, and exact description, reference being had to the accompanying drawings, forming a part of this specification.

My invention relates to electrical cables, more particularly to cables that are employed in telephone switchboards.

When telephone switchboard cables as heretofore constructed were employed, the rear of the switchboard where the cables are connected with the electrical devices, for instance the spring-jacks, became so confused and confounded, that it was only with the utmost difficulty that the cables could be identified with the spring-jacks with which they were connected, and the spring-jacks reached in case of the necessity of inspection or repair. As is well known, it is usual to extend the cables lengthwise of the spring-jack banks, a single cable being employed for each horizontal row of spring-jacks, the cables of course being fanned out as is usual, in order that the electrical conductors might be properly connected to their corresponding spring-jacks. Telephone switchboard cables of the prior art were, however, cylindrical in form, and were necessarily, on account of the number of conductors, of greater diameter than the thickness of the spring-jack. When the cables were, therefore, disposed to the rear of the spring-jacks, a single cable being employed for each horizontal row, the result was that the cables piled up to a greater height than the spring-jacks, completely hiding and covering the spring-jacks and preventing access thereto by any ordinary or convenient means.

It is the object of my invention to overcome this difficulty, and it provides a telephone switchboard cable of such construction that the combined height of all the cables will be approximately equal to the height of the spring-jack banks, whereby each cable will be disposed directly to the rear of the spring-jack row with which its conductors are connected. Such an arrangement, it is evident would facilitate ready identification of the cable with its associated spring-jack row, and would permit of ready access to the desired spring-jacks. My invention accomplishes this desired object by means of utilizing more switchboard space laterally instead of vertically, without in any way sacrificing the number of conductors or their proper installation. To this end the cable of my invention is separated into several individual cables of similar size, these cables being cylindrical in form and of a diameter less than the thickness of a spring-jack. The individual cables are then disposed side by side, and are covered by a suitable protecting sheath, means being also provided for preventing distortion or disarrangement of the entire cable.

My invention will be more readily understood by reference to the accompanying drawing, in which—

Figure 1, is a plan view, parts being broken away and shown in section; Fig. 2, is an enlarged cross sectional view, on line 2—2 of Fig. 1; Fig. 3, is a cross sectional view, similar to that of Fig. 2, but showing a slightly modified arrangement.

The entire cable is composed of the individual cables 4, 4, which are cylindrical in form, and which may be composed of any suitable number of electrical conductors 5, 5, which are properly insulated from each other, and as a unit by the insulating material 6. The cable units, as they may conveniently be called, are disposed side by side as clearly shown in the drawings, and are then suitably bound together and protected by a sheath 7, which may be of insulating material. In order that the cable may retain this shape and proportion, the sheath may be held together at one or more intermediate points in any suitable manner; for instance the upper and lower walls of the sheath may be sewed together at suitable intervals between the cable units, as indicated at 8, 8. In order that in sewing, the stitches may not pass through the cable units, whereby the electrical conductors or their insulation may be subjected to injury or mutilation, a separator 9, of suitable material for instance cotton or similar substance may be provided between the cable units, through which the stitches 8, 8, may pass. It is thus seen that the cable will retain its proper shape and proportion, any tendency for it to bunch up or change its shape being entirely overcome. The sheath may be stitched by a support provided at a single intermediate point, as shown in Figs. 1 and 2, or it may be stitched and supports provided at each interval between the cable units. It is evident of course, that any reasonable number of such cable units could be employed, the sheath therefor being stitched at sufficient intervals to maintain the cable in its proper condition.

As the lateral space in the switchboard to the rear of the spring-jacks is not limited as it is vertically, this construction will be found entirely practicable, and I thus provide a cable which may be employed in telephone switchboards, and which is so constructed that when in position and properly connected with the spring-jacks the combined height of the cables will be no greater than that of the entire spring-jack section, each cable being disposed directly to the rear of the spring-jack with which it is electrically connected.

While I have herein shown and described but one general embodiment of my invention, it is evident that changes and modifications could be made by those skilled in the art without departing from the spirit and scope thereof. I do not wish therefore to be limited to the precise construction herein shown.

I claim as new and desire to secure by Letters Patent:

1. A cable composed of a plurality of cable units disposed with their axes in the same plane, an inclosing sheath therefor, the opposite walls of the sheath being sewed together, and a separator through which the stitches may pass.

2. A cable composed of a plurality of cable units disposed with their axes in the same plane, an inclosing sheath therefor and spacers between the cable units, the opposite walls of said sheath being sewed together, the stitches passing through said spacers.

3. A cable composed of a plurality of cable units disposed with their axes in the same plane, an inclosing sheath therefor, a separator distinct from the sheath for maintaining the opposite walls of the sheath a proper distance apart and for preventing the cable units from coming together, and stitches through the sheath and separator for retaining said sheath and separator in position around the cable units.

4. A cable composed of a plurality of cable units disposed with their axes in the same plane, an inclosing sheath therefor, and separate spacers between the cable units, the opposite walls of said sheath being sewed together, the stitches passing through said spacers.

In witness whereof, I hereunto subscribe my name this 23rd day of February A. D., 1907.

WILLIAM L. RUNZEL.

Witnesses:
ARTHUR H. BOETTCHER,
LEONARD W. NOVANDER.